United States Patent
Jones et al.

(10) Patent No.: US 9,583,288 B2
(45) Date of Patent: Feb. 28, 2017

(54) INTERCHANGEABLE BACK SYSTEM FOR PROGRAMMABLE SWITCHES

(71) Applicant: Google Inc., Mountain View, CA (US)

(72) Inventors: Christopher Jones, San Francisco, CA (US); Maaike Louise Evers, San Francisco, CA (US); Michael Simonian, San Francisco, CA (US); Michael Simmons, San Francisco, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 14/253,003

(22) Filed: Apr. 15, 2014

(65) Prior Publication Data

US 2015/0294816 A1    Oct. 15, 2015

(51) Int. Cl.
| | |
|---|---|
| *H01H 1/64* | (2006.01) |
| *H01H 23/14* | (2006.01) |
| *H02G 3/12* | (2006.01) |
| *H05B 39/04* | (2006.01) |
| *H01H 11/00* | (2006.01) |

(52) U.S. Cl.
CPC ............ *H01H 23/148* (2013.01); *H02G 3/12* (2013.01); *H05B 39/04* (2013.01); *H01H 11/0018* (2013.01)

(58) Field of Classification Search
CPC ................................ H01H 23/14; H01H 9/02
USPC ....................................................... 200/293
See application file for complete search history.

(56) References Cited

U.S. PATENT DOCUMENTS

| | | | | |
|---|---|---|---|---|
| 5,998,747 A | * | 12/1999 | Kelso | H01H 23/148 174/66 |
| 6,392,170 B1 | * | 5/2002 | Wechsler | H01H 23/148 200/43.16 |
| 6,608,253 B1 | * | 8/2003 | Rintz | H01H 9/18 174/66 |
| 6,660,948 B2 | * | 12/2003 | Clegg | H01H 13/70 200/333 |
| 6,858,802 B2 | * | 2/2005 | Hagarty | H02G 15/10 174/53 |
| 7,983,026 B2 | * | 7/2011 | West | G06F 1/1601 312/245 |
| 8,373,313 B2 | | 2/2013 | Garcia et al. | |
| 9,110,449 B1 | * | 8/2015 | Walma | H05B 37/0227 |
| 2006/0161270 A1 | | 7/2006 | Luskin et al. | |

(Continued)

FOREIGN PATENT DOCUMENTS

EP    1952717    12/2009

*Primary Examiner* — Kyung Lee
(74) *Attorney, Agent, or Firm* — Morris & Kamlay LLP

(57) ABSTRACT

Systems and techniques are provided for an interchangeable back system for programmable switches. A programmable switch, remote interchangeable back, and toggle switch interchangeable back may be included. The remote interchangeable back may include a casing and a back plate, where the back plate of the remote interchangeable back may not have an opening. The toggle switch interchangeable back may include a casing and a back plate, where the back plate of the toggle switch interchangeable back may include an opening of sufficient size to accommodate a toggle light switch in the on position. The remote interchangeable back and the toggle switch interchangeable back may be interchangeably attachable to and removable from the programmable switch.

14 Claims, 4 Drawing Sheets

(56) References Cited

U.S. PATENT DOCUMENTS

| | | | | |
|---|---|---|---|---|
| 2010/0258332 A1* | 10/2010 | Yarborough | ............. | H02G 3/14 |
| | | | | 174/66 |
| 2011/0272261 A1* | 11/2011 | Johnson | ................ | H01H 23/02 |
| | | | | 200/339 |
| 2013/0092516 A1* | 4/2013 | Ray | ......................... | H01H 1/52 |
| | | | | 200/322 |

* cited by examiner

INTERCHANGEABLE BACK SYSTEM FOR PROGRAMMABLE SWITCHES

BACKGROUND

Programmable light switches used in home automation systems often need to be installed permanently in the wall in the place of an existing light switch. Permanent installation of a programmable light switch may require an electrician, as the existing light switch may need to be disconnected from building's wiring, and the programmable light switch wired into the wall. This may make replacing existing light switches with programmable light switches as part of a home automation system costly and time consuming.

Programmable light switches may also function as remotes, without being connected directly to a building's wiring system in place of the existing light switch. However, in this case the existing light switch may still control the flow of electricity to home automation equipped lighting fixtures. If the existing light switch is switched off, the remote programmable light switch may no longer be able to control the home automation equipped lighting fixture, as the light switch will cut off electricity to the light fixture, and to any home automation hardware within the light fixture.

BRIEF SUMMARY

According to an embodiment of the disclosed subject matter, an apparatus may include a programmable switch, a remote interchangeable back including a casing and a back plate, where the back plate of the remote interchangeable back may not have an opening, and a toggle switch interchangeable back including a casing and a back plate, where the back plate of the toggle switch interchangeable back may include an opening of sufficient size to accommodate a toggle light switch in the on position. The remote interchangeable back and the toggle switch interchangeable back may be interchangeably attachable to and removable from the programmable switch.

A paddle switch interchangeable back may include a casing and a back plate, where the back plate of the paddle switch interchangeable back may include a cavity of sufficient depth and angle to accommodate a paddle light switch in the on position. The paddle switch interchangeable back may be interchangeably attachable to and removable from the programmable switch.

The toggle switch interchangeable back may also include an attachment strip attached to the back plate of the toggle switch interchangeable back such that the attachment strip may be exposed when the toggle switch interchangeable back is attached to the programmable switch. The paddle switch interchangeable back may also include an attachment strip attached to the back plate of the paddle switch interchangeable back such that the at least one attachment strip may be exposed when the paddle switch interchangeable back is attached to the programmable switch. The programmable switch may also include a battery. The remote interchangeable back and the toggle switch interchangeable back may each include a battery. The remote interchangeable back and the toggle switch interchangeable back may be removably attachable to the programmable switch using non-adhesive attachment. The removable attachment may use friction between the casing of one of the interchangeable backs and a rear casing of the programmable switch. The removable attachment may use friction tabs to attach the casing of one of the interchangeable backs and a rear casing of the programmable switch. The removable attachment may use slotted tabs to attach the casing of one of the interchangeable back and a rear casing of the programmable switch.

Systems and techniques disclosed herein may allow for an interchangeable back system for programmable switches. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
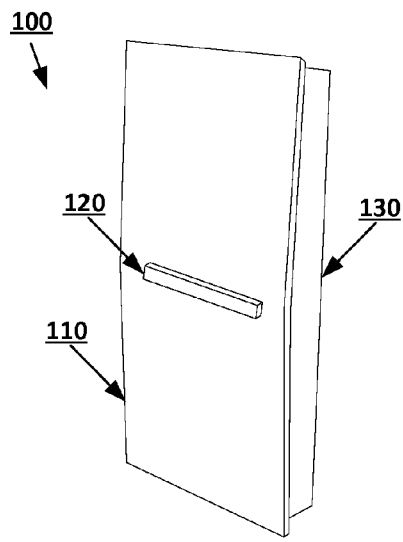
FIGS. 1a and 1b show example views of a programmable switch according an implementation of the disclosed subject matter.

An interchangeable back system may allow a programmable switch, for example, a programmable light switch, to fit over an existing light switch, thereby preventing the existing light switch from being turned off accidentally, and eliminating the need for an electrician to hardwire the programmable light switch. The interchangeable back system may allow the programmable light switch to be a remote control that fits comfortably in a user's hand. The interchangeable backs for the programmable light switch may be of various shapes and depths, allowing the backs to fit over various existing light switch types, such as, for example, paddle or toggle light switches. A slimmer interchangeable back may cover the back of the programmable light switch and make the programmable light switch more comfortable to hold in a hand. The interchangeable backs may include batteries to power the programmable light switch.

The interchangeable backs may be installed to act as the back of a programmable light switch. Any suitable attachment system may be used to hold one of the interchangeable backs on the back of the programmable light switch, including, for example, friction tabs, slotted tabs, friction fitting, and any other form of releasable attachment. Friction tabs may be tabs that create friction and may be released by pressing near the tab locations. Slotted tabs may be tabs that insert into corresponding slots, and are releasable by pressing near the slot location. The interchangeable backs may be easily installable on and removable from the programmable light switch, which may allow for appropriate backs to be installed on the programmable light switch depending on the intended use for the programmable light switch.

One of the interchangeable backs may include an opening which may fit over a traditional toggle light switch. The interchangeable back may have sufficient depth so that when the back is placed over a toggle light switch, the toggle light switch may be contained entirely within the interchangeable back, without causing the light switch to change to the off position. This may prevent the toggle light switch from being turned off while the programmable light switch with interchangeable back is installed over the toggle light switch, allowing the programmable light switch to control the functioning of any home automation equipped light bulb or light fixture connected to the toggle light switch.

One of the interchangeable backs may include an opening which may fit over a decorative, or paddle, light switch. The interchangeable back may have sufficient depth that when the back is placed over such a paddle light switch, the paddle light switch may be contained entirely within the interchangeable back or within a cavity on the back of the interchangeable back, without causing the paddle switch to change to the off position. As with the toggle light switch, this may allow the programmable light switch control over any home automation equipped light bulb or light fixture attached to the paddle light switch.

The interchangeable backs may be attached over existing light switches in any suitable manner, including, for example, adhesive strips attached to the interchangeable backs. The adhesive strips may be positioned to allow the programmable light switch with interchangeable back to attach over the appropriate existing light switch for the interchangeable back being used by adhering to, for example, the cover plate covering the switch. The interchangeable backs may be removable after being attached, allowing the existing switch to be exposed. In some implementations, the back plate of the interchangeable back may be removable from the rest of the interchangeable back and programmable light switch, and may be able to stay in place, for example, adhered to the light switch, after the programmable light switch and rest of the interchangeable back are removed.

One of the interchangeable backs may allow the programmable light switch to be held comfortably in a user's hand. For example, the interchangeable back may be shaped and contoured to better fit into a human hand, including having less depth than the interchangeable backs intended for attachment over existing light switches. The interchangeable back may allow the programmable light switch to be used as a hand held remote.

Figure 1B:
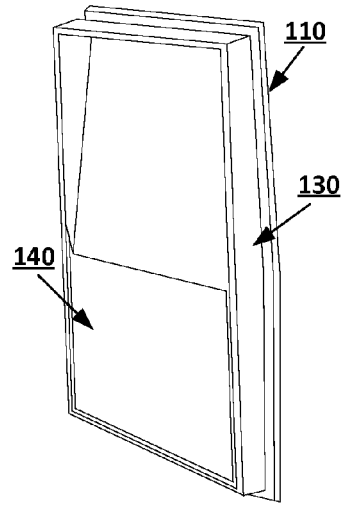

FIGS. 1a and 1b show example views of a programmable switch according an implementation of the disclosed subject matter. A programmable switch 100, which may be, for example, a programmable light switch, may include a front plate 110 and a rear casing 130. The front plate 110 may include a switch 120, which may be of any suitable switch type, including a touch-sensitive switch, a pressable switch, and a clickable switch. The rear casing 130 may include a battery compartment 140, which may house a battery to provide power to operate the programmable switch 100. The switch 120 may be used to operate any suitable home automation equipped device to which the programmable switch 100 is connected, for example, wirelessly using any suitable wireless protocol. For example, the programmable switch 100 may be a programmable light switch connected via WiFi to overhead track lighting fixtures equipped with home automation hardware. The switch 120 may control the on-off and dimmable states of the overhead track lighting fixtures.

Figure 2A:
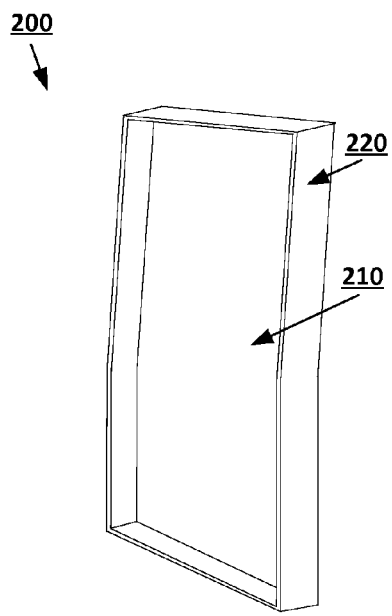
FIGS. 2a and 2b show example views of a remote interchangeable back for a programmable switch according to an implementation of the disclosed subject matter.
Figure 2B:
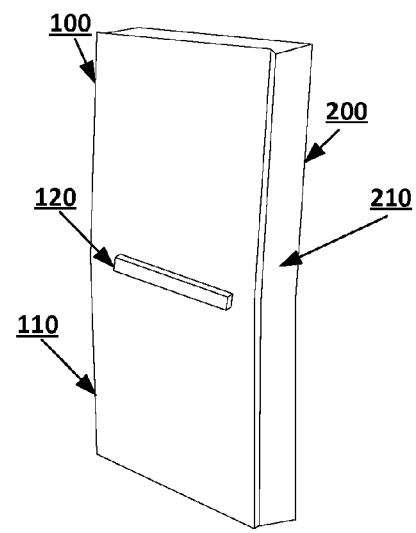

FIGS. 2a and 2b show example views of a remote interchangeable back for a programmable switch according to an implementation of the disclosed subject matter. A remote interchangeable back 200 may include a back plate 210 and a casing 220. The back plate 210 may be a solid back plate, and the casing 220 may be of appropriate size and shape to fit over the rear casing 130 of the programmable switch 100. As depicted in FIG. 2b, the remote interchangeable back 200 may be placed over the back of the programmable switch 100, with the rear casing 130 contained within the area created by the casing 220 and the back plate 210. The remote interchangeable back 200 may be held to the programmable switch 100 in any suitable manner, including through friction between the rear casing 130 and the casing 220, friction tabs, slotted tabs, or any other suitable mechanism for allowing the remote interchangeable back 200 to be removably attached to the programmable switch 100.

The remote interchangeable back 200 may have a suitable size and shape to allow the combination of the programmable switch 100 and the remote interchangeable back 200 to be held comfortably in a user's hand, allowing the programmable switch 100 to function as a hand held remote control. The remote interchangeable back 200 may also include a battery, either in addition to or in place of the battery included in the programmable switch 100, and any other suitable home automation hardware, such as, for example, radios and antennas, for enhancing or supplementing the functionality of the home automation hardware in the programmable switch 100.

Figure 3A:
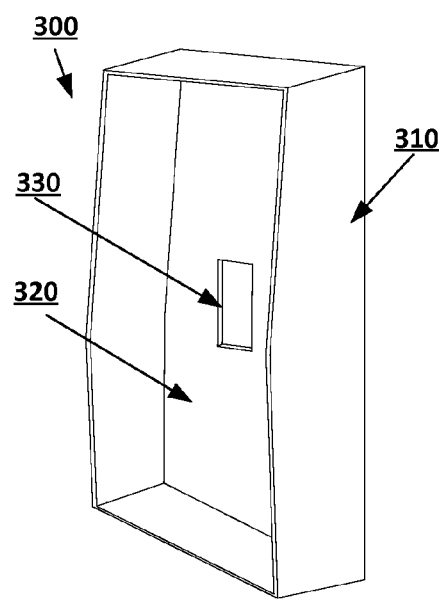
FIGS. 3a and 3b show example views of a toggle switch interchangeable back for a programmable switch according to an implementation of the disclosed subject matter.
Figure 3B:
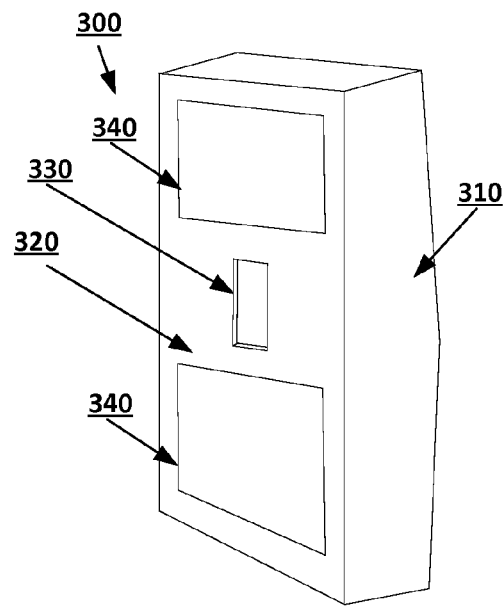

FIGS. 3a and 3b show example views of a toggle switch interchangeable back for a programmable switch according to an implementation of the disclosed subject matter. A toggle switch interchangeable back 300 may include a back plate 310 and a casing 320. The back plate 310 may include an opening 330, which may be of a suitable size and shape to accommodate a toggle light switch without requiring the toggle switch be in the off position. The opening 330 may also be of any other suitable size and shape to accommodate any other type of wall mounted switch, including other light switches and fan switches. The casing 320 may be of a suitable depth such that when the toggle switch interchangeable back 300 is attached to the programmable switch 100, the area between the rear of the programmable switch 100 and the back plate 310 is of sufficient depth to accommodate a toggle light switch without adjusting the positioning of the toggle light switch.

The back plate 310 may also include attachment strips 340. The attachment strips 340 may be any suitable material or mechanism for attaching the combination of the programmable switch 100 and the toggle switch interchangeable back 300 to a cover plate for a toggle light switch. For example, the attachment strips 340 may be reusable adhesive strips of sufficient strength to support the weight of the programmable switch 100 and the toggle switch interchangeable back 300. The toggle switch interchangeable back 300 may also include a battery, either in addition to or in place of the battery included in the programmable switch 100, and any other suitable home automation hardware, such as, for example, radios and antennas, for enhancing or supplementing the functionality of the home automation hardware in the programmable switch 100.

Figure 4A:
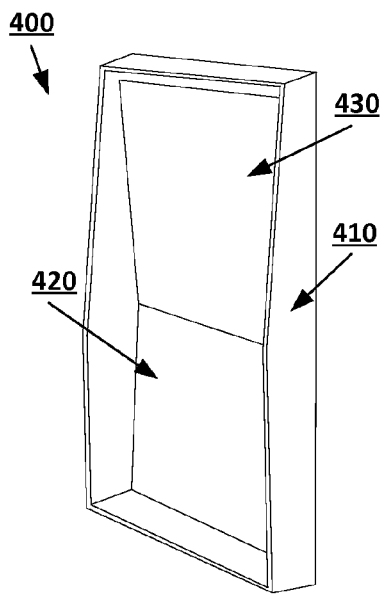
FIGS. 4a and 4b show example views of a paddle switch interchangeable back for a programmable switch according to an implementation of the disclosed subject matter.
Figure 4B:
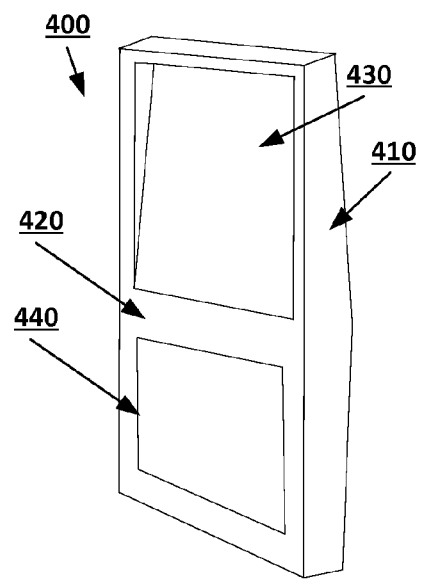

FIGS. 4a and 4b show example views of a paddle switch interchangeable back for a programmable switch according to an implementation of the disclosed subject matter. A paddle switch interchangeable back 400 may include a back plate 410 and a casing 420. The back plate 410 may include a cavity 430, which may be of a suitable size and shape to accommodate a paddle light switch in the on position. The top half of paddle light switch may rest in the cavity 430 in the on position, while the lower half of the back plate 410 may ensure that the lower half of the paddle switch remains in the off position. The cavity 430 may also be of any other suitable size and shape to accommodate any other type of wall mounted switch, including other light switches and fan switches. The casing 420 may be of a suitable depth such that when the paddle switch interchangeable back 300 is attached to the programmable switch 100, the cavity 430 is of sufficient depth to accommodate a paddle light switch without adjusting the positioning of the paddle light switch, while still allowing the casing 420 to fit over the rear casing 130.

The back plate 310 may also include attachment strip 440. The attachment strip 440 may be any suitable material or mechanism for attaching the combination of the programmable switch 100 and the paddle switch interchangeable back 400 to a cover plate for a toggle light switch. For example, the attachment strip 440 may be a reusable adhesive strip of sufficient strength to support the weight of the programmable switch 100 and the paddle switch interchangeable back 400. The paddle switch interchangeable back 400 may also include a battery, either in addition to or in place of the battery included in the programmable switch 100, and any other suitable home automation hardware, such as, for example, radios and antennas, for enhancing or supplementing the functionality of the home automation hardware in the programmable switch 100.

Figure 5:
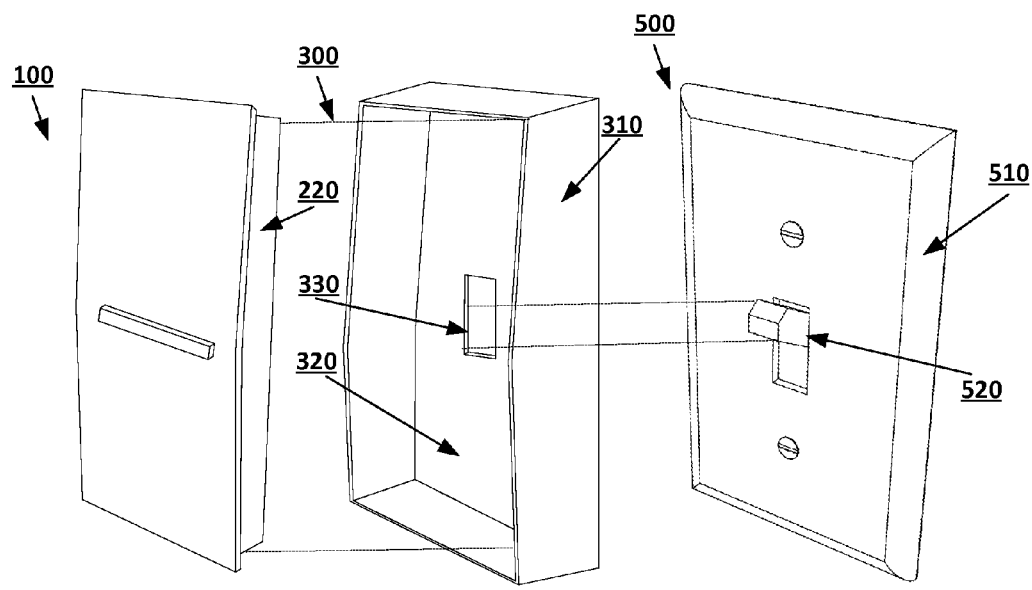
FIG. 5 shows example views of a programmable switch, toggle switch interchangeable back for a programmable switch, and light switch according to an implementation of the disclosed subject matter.

FIG. 5 shows example views of a programmable switch, toggle switch interchangeable back for a programmable switch, and light switch according to an implementation of the disclosed subject matter. The programmable switch 100 may be attached to the toggle switch interchangeable back 300, with the casing 320 of the toggle switch interchangeable back 300 enclosing the rear casing 130 of the programmable switch 100. The combination of the programmable switch 100 and the toggle switch interchangeable back 300 may be attached, for example, using the attachment strips 340, to the cover plate 510 of the light switch 500. The toggle switch 520 of the light switch 500 may be set to the on position, and may enter the opening 330 and be contained within the toggle switch interchangeable back 300. This may allow the outside of the back plate 320 to contact the cover plate 510, attaching the programmable switch 100 and the toggle switch interchangeable back 300 to the light switch 500. The toggle switch 520 may be prevented from being switched to an off position, as the toggle switch 520 may not be accessible while covered by the toggle switch interchangeable back 300. This may allow any light fixtures with appropriate home automation hardware that are electrically connected to the light switch 500 to be controlled by the switch 120. The toggle switch 520 may remain in the on position to allow power to be supplied to the light fixtures, ensuring continued power to the home automation hardware in the light fixtures The combination of the programmable switch 100 and the toggle switch interchangeable back 300 may be removable from the light switch 100, and the toggle switch interchangeable back 300 may be removed from the programmable switch 100. This may allow for access to the battery in the programmable switch 100, and for a different interchangeable back to be used with the programmable switch 100.

Figure 6:
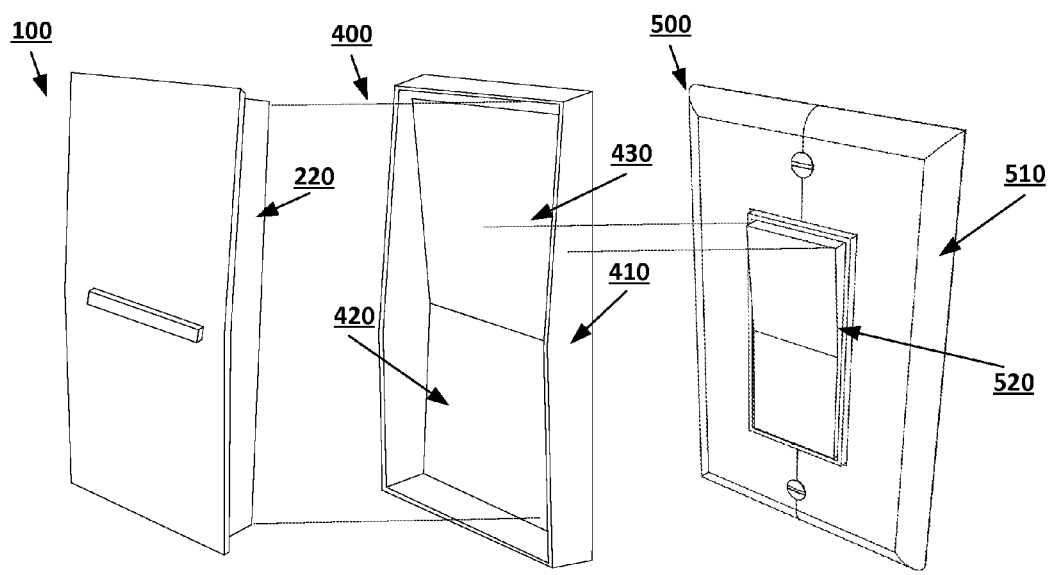
FIG. 6 shows example views of a programmable switch, paddle switch interchangeable back for a programmable switch, and light switch according to an implementation of the disclosed subject matter.

FIG. 6 shows example views of a programmable switch, paddle switch interchangeable back for a programmable switch, and light switch according to an implementation of the disclosed subject matter. The programmable switch 100 may be attached to the paddle switch interchangeable back 400, with the casing 420 of the paddle switch interchangeable back 400 enclosing the rear casing 130 of the programmable switch 100. The combination of the programmable switch 100 and the paddle switch interchangeable back 400 may be attached, for example, using the attachment strip 440, to the cover plate 610 of the light switch 600. The paddle switch 620 of the light switch 600 may be set to the on position, and may rest in the cavity 430 of the paddle switch interchangeable back 400. This may allow the outside of the back plate 420 to contact the cover plate 610, attaching the programmable switch 100 and the paddle switch interchangeable back 400 to the light switch 600. The paddle switch 620 may be prevented from being switched to an off position, as the paddle switch 620 may not be accessible while covered by the paddle switch interchangeable back 400. This may allow any light fixtures with appropriate home automation hardware that are electrically connected to the light switch 600 to be controlled by the switch 120. The paddle switch 620 may remain in the on position to allow power to be supplied to the light fixtures, ensuring continued power to the home automation hardware in the light fixtures The combination of the programmable switch 100 and the paddle switch interchangeable back 400 may be removable from the light switch 100, and the paddle switch interchangeable back 400 may be removed from the programmable switch 100. This may allow for access to the battery in the programmable switch 100, and for a different interchangeable back to be used with the programmable switch 100.

The back plate 320 of the toggle switch interchangeable back 300 and the back plate 420 of the paddle switch interchangeable back 400 may be removable. For example, the back plate 320 may be removable from the toggle switch interchangeable back 300 so that the back plate 320 may remain attached to the cover plate 510 when the programmable switch 100 and the rest of the toggle switch interchangeable back 300 are removed. This may allow for easier installation of the toggle switch interchangeable back 300 over the switch 500, or for the use of an interchangeable back with a differently shaped casing, without requiring that the opening 330 of the back plate 320 be aligned with the toggle switch 520 during installation.

Figure 7:
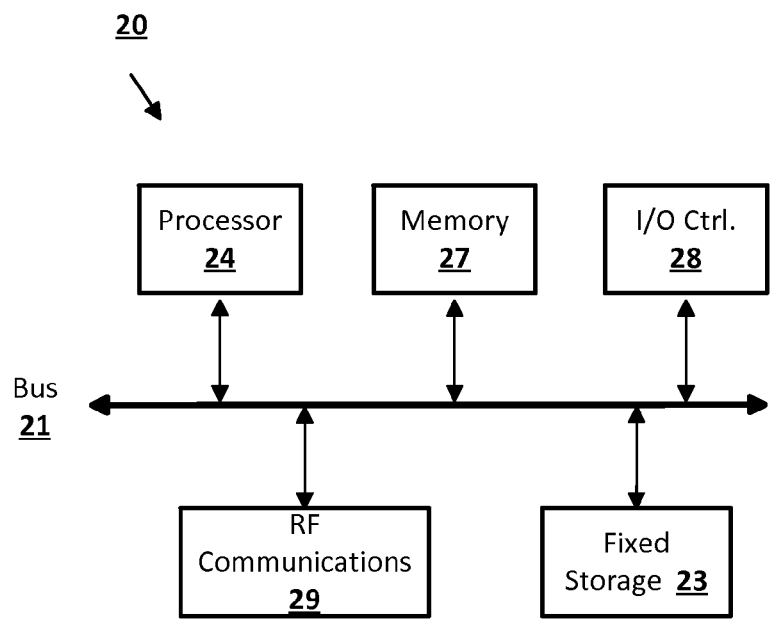
FIG. 7 is an example home automation hardware system 20 suitable for implementing embodiments of the presently disclosed subject matter.

Embodiments of the presently disclosed subject matter may be implemented in and used with a variety of component and network architectures. FIG. 7 is an example of home automation hardware system 20 suitable for implementing embodiments of the presently disclosed subject matter. The home automation hardware 20 includes a bus 21 which interconnects major components of the home automation hardware 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, and other components known in the art to use in or in conjunction with general-purpose computing systems and specifically with home automation hardware systems The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the home automation hardware 20 are generally stored on and accessed via a computer readable medium, such as the fixed storage 23 and/or the memory 27, or the like.

Each component shown may be integral with the home automation hardware system 20 or may be separate and accessed through other interfaces. Other interfaces, such as a RF communications 29, may provide a connection to remote systems and devices via a wireless local- or wide-area network connection, proprietary network connections, or the like. For example, the RF communications 29 may allow the home automation hardware 20 to communicate with other computers via one or more local, wide-area, or other networks. The RF communications 29 may include a radio suitable for communicating using RF emissions, and a network interface for interacting with other network systems, such as a home automation network. The input/output controller 28 may be suitable for controlling the light bulb 520 based on commands received through the RF communications 29, from, for example, other equipment in the home automation network.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. An apparatus comprising:
    a programmable switch;
    a remote interchangeable back comprising a casing and a back plate, wherein the back plate of the remote interchangeable back does not have an opening; and
    a toggle switch interchangeable back comprising a casing and a back plate, wherein the back plate of the toggle switch interchangeable back comprises an opening of sufficient size to accommodate a toggle light switch in the on position and is of sufficient depth to accommodate the toggle light switch when the toggle switch interchangeable back is attached to the programmable switch,
    wherein the remote interchangeable back and the toggle switch interchangeable back are interchangeably attachable to and removable from the programmable switch.

2. The apparatus of claim 1, further comprising:
    a paddle switch interchangeable back comprising a casing and a back plate, wherein the back plate of the paddle switch interchangeable back comprises a cavity of sufficient depth and angle to accommodate a paddle light switch in the on position, and wherein the paddle switch interchangeable back is interchangeably attachable to and removable from the programmable switch.

3. The apparatus of claim 2, wherein the paddle switch interchangeable back further comprises at least one attachment strip attached to the back plate of the paddle switch interchangeable back such that the at least one attachment strip is exposed when the paddle switch interchangeable back is attached to the programmable switch.

4. The apparatus of claim 1, wherein the toggle switch interchangeable back further comprises at least one attachment strip attached to the back plate of the toggle switch interchangeable back such that the at least one attachment strip is exposed when the toggle switch interchangeable back is attached to the programmable switch.

5. The apparatus of claim 1, wherein the programmable switch further comprises a battery.

6. The apparatus of claim 1, wherein the remote interchangeable back and the toggle switch interchangeable back each further comprise a battery.

7. The apparatus of claim 1, wherein the remote interchangeable back and the toggle switch interchangeable back are removably attachable to the programmable switch using non-adhesive attachment.

8. The apparatus of claim 7, wherein the removable attachment uses friction between the casing of one of the interchangeable backs and a rear casing of the programmable switch.

9. The apparatus of claim 7, wherein the removable attachment uses friction tabs to attach the casing of one of the interchangeable backs and a rear casing of the programmable switch.

10. The apparatus of claim 7, wherein the removable attachment uses slotted tabs to attach the casing of one of the interchangeable back and a rear casing of the programmable switch.

11. An apparatus comprising:
    a programmable switch comprising a front plate, a switch, a rear casing, a battery, and home automation hardware, wherein the switch is disposed on the front plate; and
    a toggle switch interchangeable back comprising a casing, a back plate, and an opening disposed on the back plate and of sufficient size to accommodate a toggle light switch, and wherein the toggle switch interchangeable back is removably attachable to the programmable switch, and is of sufficient depth to accommodate the toggle light switch when the toggle switch interchangeable back is attached to the programmable switch, the toggle switch interchangeable back is removably attachable to a cover plate for a toggle light switch, and the home automation hardware controls at least one light fixture electrically connected to the toggle light switch.

12. The apparatus of claim 11, further comprising:
a paddle switch interchangeable back comprising a casing, a back plate, and a cavity disposed on the back plate and of sufficient size to accommodate a paddle light switch, and wherein the paddle switch interchangeable back is removably attached to the programmable switch in place of the toggle switch interchangeable back.

13. The apparatus of claim 12, wherein the programmable switch is removably attachable to the paddle switch interchangeable back using one item selected from the group consisting of: friction fitting, friction tabs, and slotted tabs.

14. The apparatus of claim 11, wherein the programmable switch is removably attachable to the toggle switch interchangeable back using one item selected from the group consisting of: friction fitting, friction tabs, and slotted tabs.

* * * * *